Oct. 30, 1956 G. SCHADEBERG 2,768,844
HOSE COUPLING REDUCER HAVING INTERNAL
AND EXTERNAL STEPPED SLEEVES
Filed March 19, 1953 2 Sheets-Sheet 1

INVENTOR
GEORGE SCHADEBERG
BY Arthur R. Woolfolk
ATTORNEY

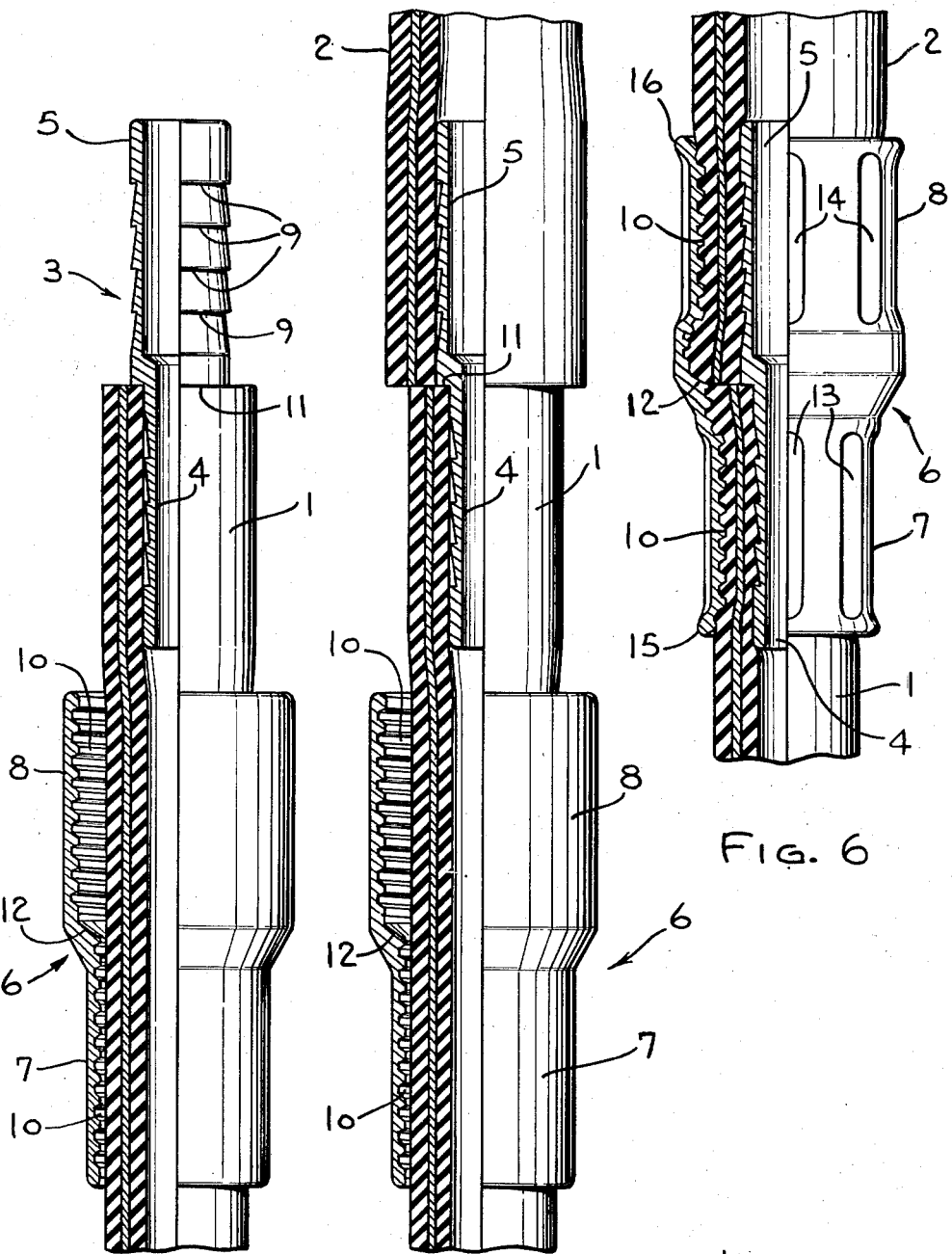

United States Patent Office 2,768,844
Patented Oct. 30, 1956

2,768,844

HOSE COUPLING REDUCER HAVING INTERNAL AND EXTERNAL STEPPED SLEEVES

George Schadeberg, Manitowoc, Wis., assignor to Eastman Manufacturing Company, Manitowoc, Wis.

Application March 19, 1953, Serial No. 343,393

1 Claim. (Cl. 285—177)

This invention relates to a hose coupling reducer or, in other words, to a dual hose coupling.

It has been found in a number of instances that it is desirable to couple two different sizes of hoses. As an example, it has been found in automobile practice that where the oil pump is connected to the steering cylinder in automatic power steering devices that there is a considerable amount of throbbing or pulsation due to the action of the pump in the lengths of hose connecting the pump with the steering cylinder or steering motor. It has been found that if two different sizes of hose are used, for instance, a three eighth inch inside diameter hose connected to the pump and a one quarter inch inside diameter hose connected to the cylinder and joined to the larger hose, that the pulsations are substantially stopped provided the larger hose is approximately twice the length of the shorter hose. This particular application of the hose reducer is not intended in any way to limit the scope of the invention but is merely used to illustrate one of the places where the hose coupling reducer or dual hose coupling is useful.

This invention is designed to provide a hose coupling which acts as a hose reducer so that two different sizes of hose may be joined in a simple and easy manner with assurance that the coupling will stay in place on each hose throughout the life of the hose irrespective of surges or jarrings to which the coupling may be subjected.

In greater detail, objects of this invention are to provide a hose coupling in which a single unitary insert is employed which has two external diameters and two internal diameters, the smaller portion of the insert being insertable into the smaller hose and the larger portion of the insert being insertable into the larger hose and in which a unitary sleeve is provided which has two portions of different internal diameters which may be suitably contracted about the respective hoses after the insert has been positioned within the hoses.

Further objects are to provide a hose coupling reducer or dual hose coupling in which the insert is provided with a shoulder against which the smaller hose is adapted to bear when the smaller end of the insert is inserted to its full extent into the smaller hose and which is so made that the larger hose will thereafter find a shoulder against the smaller hose to thus define and limit the position of the larger hose when the larger portion of the insert is inserted in the larger hose, the sleeve being initially carried by the smaller hose and being arranged to be slid along the smaller hose until a shoulder within the sleeve arrests further motion of the sleeve at the exact position where a proper amount of the larger hose has been enclosed by the sleeve and a proper amount of the smaller hose has also been enclosed by a smaller portion of the sleeve. Thereafter, it is contemplated in this invention that each portion of the sleeve, the larger and the smaller portions, shall be suitably contracted as, for example, by means of crimping so as to firmly grip both the smaller and the larger portions of the hose between the sleeve and the insert.

An embodiment of the invention is shown in the accompanying drawings in which:

Figure 3 is a view partly in section showing the initial step in the assembly of the coupling on the hose.

Figure 4 is a view partly in section showing a further step in the assembly of the coupling on the hose.

Figure 6 is a view partly in section showing the coupling completely contracted or crimped.

Figure 1:
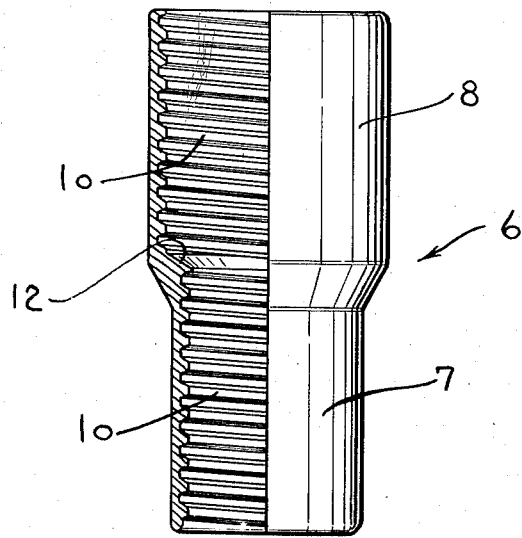
Figure 1 is a view partly in section of the sleeve.
Figure 2:
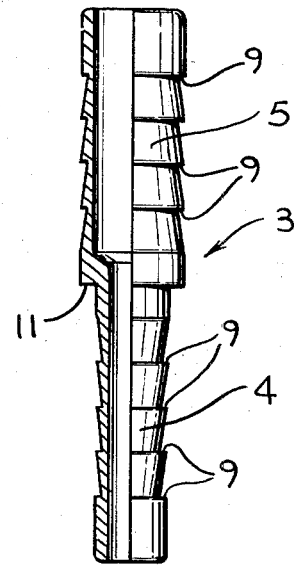
Figure 2 is a view partly in section of the insert.
Figure 5:
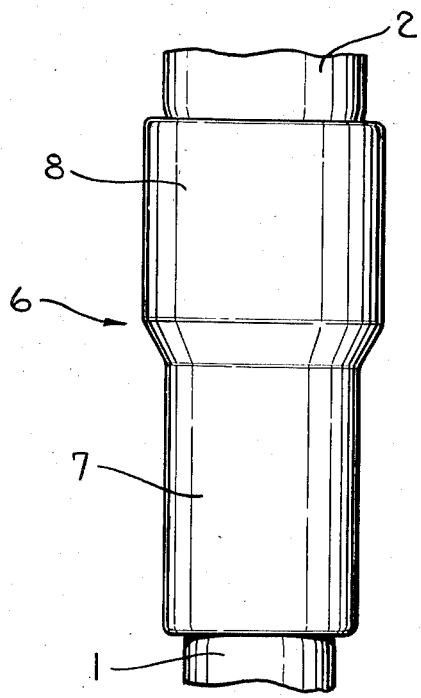
Figure 5 is an external view showing the position of the parts when the coupling is fully assembled on the hose but before the coupling has been crimped or contracted.

Referring to the drawings it will be seen that the coupling is adapted to join two different sizes of hose, for instance, the smaller hose indicated generally by the reference character 1 and the larger hose indicated generally by the reference character 2. The coupling is composed of an insert indicated generally by the reference character 3, as shown in Figure 2, the insert being provided with the smaller portion 4 and with the larger portion 5. The outer portion of the coupling consists of a sleeve indicated generally by the reference character 6 and shown in Figure 1. This sleeve has a smaller portion 7 and a larger portion 8. Both the insert and the sleeve are provided with hose gripping means, for example with saw toothlike shoulders 9 on the insert and with threads 10 interiorly of the sleeve as shown in Figures 2 and 1.

It is to be noted particularly that the insert is provided with an abrupt shoulder 11, see for example Figure 2, at the point where the smaller portion 4 joins the larger portion 5 and that the sleeve is provided with an internal shoulder 12 which engages the end of the larger hose 2 when the sleeve is in the position shown in Figure 6. Thereafter both the smaller and the larger portions of the sleeve are contracted as by means of crimping indicated at 13 and 14, in Figure 6. It is to be noted that the crimping stops short of each end of the sleeve and thus provides an outwardly turned lip at each end of the sleeve, the lips being indicated by the reference characters 15 and 16 in Figure 6. This provides protection for the hose when it is bent closely adjacent the coupling. Also it is to be noted from reference to Figure 6 that the sleeve stops short of each end of the insert. This prevents any possibility of forcing the hose to flow inwardly and adjacent the end of the insert and thus avoids any constriction of the bore of the hose.

It will be seen that a novel form of hose coupling has been provided by this invention which is very simple to construct and which is easy to apply. The way in which the insert is constructed insures the correct positioning of the insert with reference to both the smaller and the larger hose, and the way the sleeve is constructed insures the correct positioning of the sleeve, not only with reference to both the smaller and larger hose but also with reference to the insert.

Although this invention has been described in considerable detail, it is to be understood that such description is intended as illustrative rather than limiting, as the invention may be variously embodied and is to be interpreted as claimed.

I claim:

A coupling reducer unit assembly for connecting a small hose to a large hose, said coupling reducing unit assembly comprising an integral insert having a first portion and a second portion with the first portion being a relatively small diameter portion with reference to the second portion and with the second portion being a relatively large diameter portion with reference to the first portion, said insert having a shoulder between said portions, a small hose having an end encircling and fitting the small portion of said insert and abutting said shoulder, said shoulder constituting a stop for the end of the small hose, a large hose having an end encircling and fitting the large diameter portion of the insert and having the end of the large hose abutting the end of the small hose with the end of the small hose constituting a stop for the end of the large hose, and a single integral continuous and uninterrupted sleeve surrounding the end portion of each hose and contracted to grip the end portions of the hoses between the insert and the sleeve, said sleeve having an internal shoulder contacting the end of the large hose, whereby the shoulder of the insert coacts with the end of the small hose and the shoulder of the sleeve coacts with the end of the large hose to correctly position the sleeve with reference to the insert.

References Cited in the file of this patent

UNITED STATES PATENTS

| | | |
|---|---|---|
| 407,037 | Robertson | July 16, 1889 |
| 748,301 | Nicholls | Dec. 29, 1903 |
| 1,085,095 | Schurman | Jan. 20, 1914 |
| 1,382,840 | Levedahl | June 28, 1921 |
| 1,977,564 | Weatherhead | Oct. 16, 1934 |

FOREIGN PATENTS

| | | |
|---|---|---|
| 711,203 | France | June 23, 1931 |
| 878,805 | France | Nov. 2, 1942 |